(12) United States Patent
Watanabe et al.

(10) Patent No.: US 8,109,118 B2
(45) Date of Patent: Feb. 7, 2012

(54) METHOD FOR REMOVING BUBBLES FROM MOLTEN GLASS AND PROCESS FOR PRODUCING GLASS

(75) Inventors: Mitsuru Watanabe, Chiyoda-ku (JP); Yutaka Kuroiwa, Chiyoda-ku (JP); Motoichi Iga, Chiyoda-ku (JP); Setsuro Ito, Chiyoda-ku (JP); Yasuji Fukasawa, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 399 days.

(21) Appl. No.: 12/265,841

(22) Filed: Nov. 6, 2008

(65) Prior Publication Data

US 2009/0113938 A1    May 7, 2009

Related U.S. Application Data

(63) Continuation of application No. PCT/JP2007/055144, filed on Mar. 14, 2007.

(30) Foreign Application Priority Data

May 11, 2006  (JP) .................................. 2006-132406

(51) Int. Cl.
  *C03B 5/16*    (2006.01)
  *C03B 5/18*    (2006.01)
  *C03B 5/225*  (2006.01)
(52) U.S. Cl. ..................... 65/134.9; 65/134.1; 65/135.6
(58) Field of Classification Search ................ 65/134.9, 65/405; 372/4, 74, 28, 29.01, 30, 32
See application file for complete search history.

(56) References Cited

U.S. PATENT DOCUMENTS

| | | | | |
|---|---|---|---|---|
| 3,415,636 | A | * | 12/1968 | Upton .............................. 65/392 |
| 3,612,702 | A | * | 10/1971 | Troll .............................. 356/430 |
| 4,443,493 | A | * | 4/1984 | Delfino ......................... 438/760 |

(Continued)

FOREIGN PATENT DOCUMENTS

JP          60-31306        3/1985

(Continued)

OTHER PUBLICATIONS

Murazawa, Naoki. "Laser trapping of deformable objects," OPTICS EXPRESS, vol. 15, No. 20 Oct. 1, 2007 published online Sep. 28, 2007 as viewed at www.Springerlink.com on Feb. 4, 2011.*

(Continued)

*Primary Examiner* — Matthew Daniels
*Assistant Examiner* — Jodi C Franklin
(74) *Attorney, Agent, or Firm* — Oblon, Spivak, McClelland, Maier & Neustadt, L.L.P.

(57) ABSTRACT

It is an object of the present invention to provide a method and apparatus for efficiently remove bubbles present on a surface of molten glass, which can solve a problem that bubbles remaining on a surface of molten glass are get inside at a time of forming the glass to cause inside bubbles, to thereby provide a glass substrate of good quality, and which can improve productivity of glass substrates; and to provide a process for producing glass employing the above method for removing bubbles. The present invention provides a method for removing bubbles from molten glass, which is a method for removing floating bubbles on a surface of molten glass, wherein a floating bubble on the surface of molten glass is irradiated with at least one laser beam.

6 Claims, 2 Drawing Sheets

U.S. PATENT DOCUMENTS

| | | | | |
|---|---|---|---|---|
| 6,599,948 B1 * | 7/2003 | Hammond | | 516/115 |
| 6,685,868 B2 * | 2/2004 | Costin | | 264/400 |
| 6,795,484 B1 * | 9/2004 | Huber et al. | | 373/27 |

FOREIGN PATENT DOCUMENTS

| | | |
|---|---|---|
| JP | 63-104620 | 5/1988 |
| JP | 63-252509 | 10/1988 |
| JP | 11-349335 | 12/1999 |
| JP | 2002-523205 | 7/2002 |
| JP | 2004-091307 | 3/2004 |
| JP | 2004-284949 | 10/2004 |

OTHER PUBLICATIONS

Juodkazis, S. "Laser irradiation induced disintegration of a bubble in a glass melt" Appl. Phys. A 87, pp. 41-45 (2007).*

* cited by examiner

Fig.1
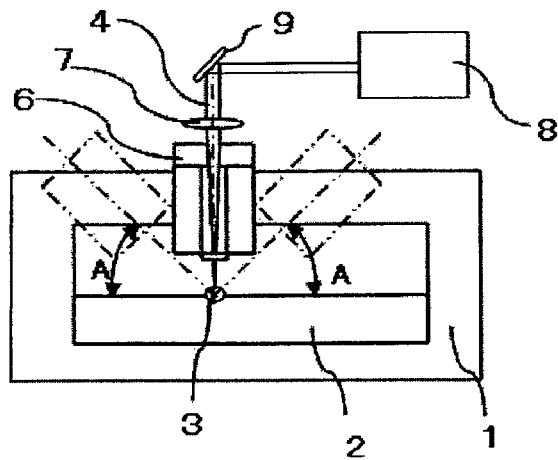
Fig.2
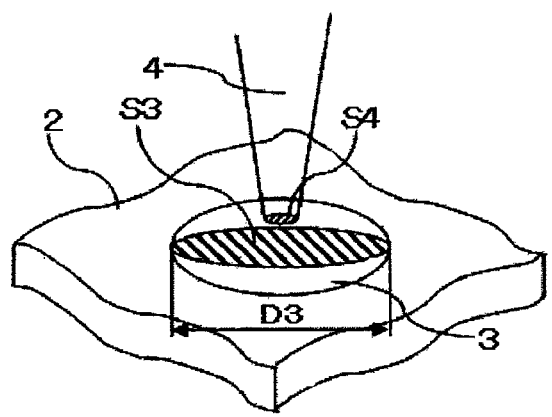
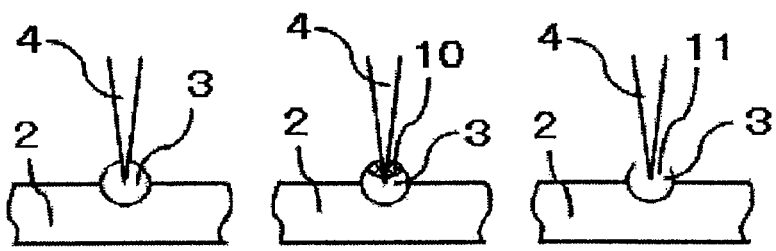
Fig.3(a) Fig.3(b) Fig.3(c)

METHOD FOR REMOVING BUBBLES FROM MOLTEN GLASS AND PROCESS FOR PRODUCING GLASS

TECHNICAL FIELD

The present invention relates to a method for removing bubbles generated at a time of melting glass, particularly to a method for removing floating bubbles on a surface of molten glass.

BACKGROUND ART

Heretofore, a glass substrate have been produced by melting a glass raw material at high temperature, sufficiently stirring such a molten glass, forming the molten glass into flat plate shape, and cooling the formed glass. In the step of melting the raw material, a large number of bubbles are generated in the molten glass.

Heretofore, in order to solve this problem, mixing of refining agent, or bubbling or stirring of molten glass (refer to JP-A-2004-91307 and JP-A-11-349335) to promote moving up of bubbles to a surface and breaking bubbles on a molten glass surface to remove bubbles. However, even by using these means, there are problems such as unevenness of glass composition or bubbles remaining unbroken on a molten glass surface, particularly, there is often a problem that bubbles remaining on a surface of molten glass in a refiner are got into inside of the glass at a time of forming the glass, to form defects in a glass substrate.

Patent Document 1: JP-A-2004-91307
Patent Document 2: JP-A-11-349335

DISCLOSURE OF THE INVENTION

Problems to be Solved by the Invention

The present invention has been made considering the above circumstances, and it is an object of the present invention to provide a method for efficiently removing bubbles remaining on a surface of molten glass at a time of producing glass substrates, an apparatus for removing bubbles and a process for producing glass employing the above method for removing bubbles.

Means for Solving the Problems

In order to achieve the above objects, the present invention provides a method for removing bubbles from molten glass, which is a method for removing floating bubbles on a surface of molten glass, wherein a floating bubble on the surface of molten glass is irradiated with at least one laser beam.

In the present invention, it is preferred that the laser beam is incident on the surface of molten glass at an angle of at least 45°.

Further, in the present invention, it is preferred that the laser beam has a wavelength of from 3 to 11 μm.

Further, in the present invention, it is preferred that the average power density of laser beam is from 5 to 50,000,000 W/cm$^2$ provided that the average power density is defined as an average power of laser beam irradiation portion on the floating bubble on a surface of molten glass divided by an irradiation area, and that the irradiation area is defined as an area of a portion encompassed by a curve on which the energy density distribution becomes 1/e$^2$ (e is the base of natural logarithm) of the maximum power density in the laser beam irradiation portion.

Further, in the present invention, it is preferred that the irradiation area of laser beam on the floating bubble is at most a projected cross sectional area of the floating bubble.

In the present invention, it is preferred that the repetitive frequency of the laser beam is at least 0.1 Hz, and the laser beam is irradiated for at least 0.05 sec.

Further, in the present invention, it is preferred that the laser beam is scanned relatively to the floating bubble on the molten glass surface at a speed of at most 200 mm/sec.

The present invention provides an apparatus for removing bubbles from molten glass that is an apparatus for removing floating bubbles on a surface of molten glass, which comprises a mechanism of irradiating at least one laser beam on a floating bubble on a surface of molten glass at an incident angle of at least 450 to the surface of molten glass, and a mechanism for scanning the laser beam relatively to the floating bubble of the molten glass.

The present invention provides a process for producing glass comprising melting a glass raw material, removing floating bubbles remaining on a surface of molten glass by the above method for removing bubbles from molten glass, and forming and solidifying the molten glass.

Further, in the present invention, it is preferred that the step of removing floating bubbles on the surface of molten glass is carried out in a process of producing glass plates from continuously supplied molten glass.

Effects of the Invention

According to the present invention, it is possible to remove defects due to bubbles remaining on a molten glass surface, and accordingly, it is possible to provide a glass substrate of good quality and to improve productivity of glass substrates.

BRIEF EXPLANATION OF THE DRAWINGS

FIG. 1: A schematic cross sectional view explaining the method for removing bubbles according to the present invention.

FIG. 2: A partial schematic oblique view explaining the method for removing bubbles according to the present invention.

FIG. 3: A schematic view explaining the principle of the method for removing bubbles according to the present invention.

EXPLANATION OF NUMERALS

Figure 4:
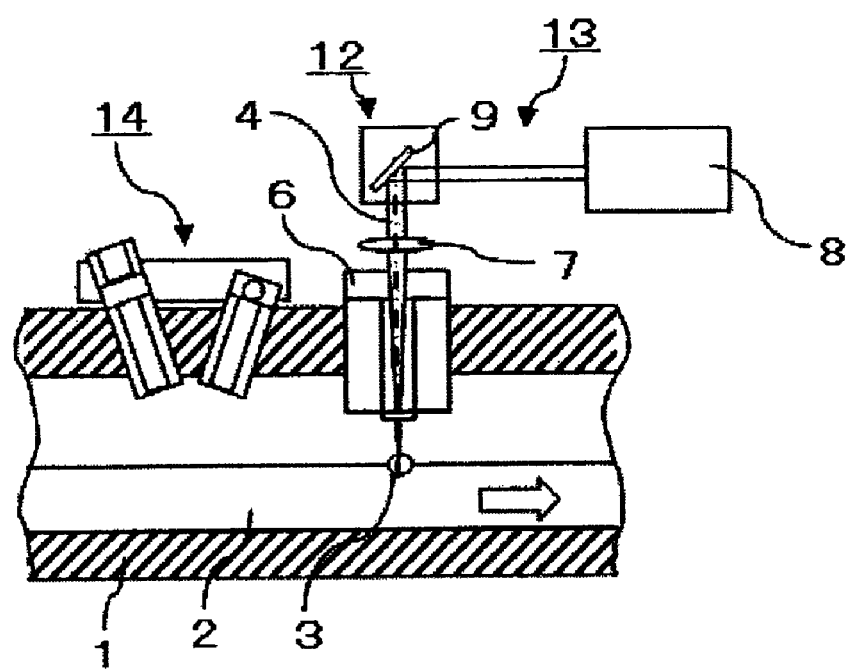
FIG. 4: A schematic explanation view of an apparatus for removing bubbles according to the present invention.

1: Melting bath, 2: molten glass, 3: floating bubble, 4: laser beam, 6: laser beam introduction window, 7: lens, 8: laser light source, 9: mirror, 10: wobble, 11: breakage of bubble, 12: mechanism for scanning laser beam, 13: mechanism for irradiating laser beam, 14: sensor.

BEST MODE FOR CARRYING OUT THE INVENTION

From now, with reference to drawings, preferred embodiments of the method and apparatus of the present invention for removing bubbles remaining on a molten glass surface, are described in detail.

In the present invention, gas components contained in bubbles to be removed, that were present on a molten glass surface, is not particularly limited, and the glass material constituting the molten glass is not particularly limited as well. Accordingly, the method of the present invention is applicable to nearly all glass materials. Here, removal of bubbles in the present invention includes reducing the size of bubble.

FIG. 1 is a schematic cross sectional view explaining the method for removing bubbles according to the present invention, FIG. 2 is a partial schematic oblique view explaining the process for removing bubbles according to the present invention, and FIG. 3 is a schematic view explaining the principle of the method for removing bubbles according to the present invention. As shown in FIG. 1, in the method for removing bubbles of the present invention, a floating bubble 3 on a surface of molten glass 2 melted in a melting bath 1 is irradiated with a laser beam 4 generated by a laser light source 8.

The laser beam 4 is generated by the laser light source 8, the path of the laser beam is changed by a mirror 9 disposed above a laser beam introduction window 6, the laser beam 4 passes through a lens to have a desired cross section, and is irradiated on a bubble on a surface of a molten glass 2 through the laser beam introduction window 6 disposed on a melting bath 1.

Since the temperature of melting bath 1 is high, the laser light source 8 is preferably installed in a place not affected by the temperature of melting bath 1, or is preferably provided with a cooling apparatus. Further, considering heat radiation from the laser beam introduction window 6 disposed on the upper portion of the melting bath 1 or considering maintenance of the laser beam introduction window 6, the laser light source 8 is preferably disposed at a position enabling to irradiate a laser beam via the mirror 9 disposed above the laser beam introduction window 6 instead of disposing the laser light source 8 at a position for directly irradiating into the melting path 1 the laser beam 4 that is output from the laser light source 8.

The mirror 9 is preferably a gold-coated mirror, but it is not particularly limited so long as it is not susceptible to radiation heat from the laser beam introduction window 6, and so long as reflection loss of power of laser beam 4 is small enough to obtain a power required for breaking a floating bubble 3. The mirror 9 preferably has a mechanism of adjusting the position according to the angular position of the laser light source 8 and the angular position of an irradiation portion 4. Further, the mirror 9 preferably has a mechanism for adjusting its angle so as to adjust an irradiation position to a floating bubble 3 present at an optional position on a surface of the molten glass 2.

The lens 7 is not particularly limited in the shape and material so long as it can form a laser beam 4 emitted from the laser light source 8 into a desired laser beam 4, and it can produce a desired laser power at the position of floating bubbles 3. Further, the lens 7 has a construction constituted by a single lens or a plurality of lenses depending on the focal length.

The material of laser beam introduction window 6 is preferably zinc selenide (ZnSe) that is not susceptible to irradiation heat and that is a material transmitting infrared rays, but it is not particularly limited so long as it hardly absorbs a laser beam having low pulse frequency and is transparent for visible light. Further, since it is sufficient that the laser beam introduction window 6 enables to maintain an atmosphere of the melting bath 1 and to allow irradiation of the laser beam 4 into the melting bath 1, the laser beam introduction window 6 may be omitted if the melting bath is configured to allow the laser beam irradiation portion to be open.

The laser beam 4 is irradiated so that the angle A to the surface of molten glass 2 becomes at least 45°. When the angle A of irradiation to the surface of molten glass 2 is lower than 45°, the cross section of laser beam 4 on the surface of the molten glass 2 may become too large to make it to a desired width, and accordingly, the angle A is preferably at least 45°, more preferably at least 55°.

As shown in FIGS. 3(a) to 3(c), the principle of removing bubbles according to the present invention is considered as follows. As shown in FIG. 3(a), when a laser beam 4 is irradiated on a floating bubble on a surface of molten glass 2, a wall of the bubble 3 absorbs the laser beam 4 to partially raise the temperature of the floating bubble 3. Accordingly, as shown in FIG. 3(b), wobble 10 of e.g. glass temperature, density or surface tension of the wall of floating bubble 3 locally occurs. As shown in FIG. 3(c), breakage 11 of the floating bubble 3 occurs from the wobble 10 as the starting point. The local wobble 10 or breakage 11 of the floating bubble 3 does not adversely affect the molten glass 2 at times of forming or solidification of the glass 2 since the temperature of molten glass 2 is higher than the melting temperature and the size of wobble 10 or the breakage 11 is so small that it is negligible to the surface area of molten glass 2.

The laser beam 4 preferably has a wavelength of at least 3 micron and at most 11 micron. When the wavelength is shorter than 3 micron, a wall of molten glass 2 forming a floating bubble 3 remaining on a surface of the molten glass 2 does not absorb the laser beam 4 and the wall of the floating bubble 3 may not be sufficiently heated. Further, when the wavelength is longer than 11 micron, it is difficult to obtain a laser apparatus for such a wavelength, and thus, such a method is not practical.

As shown in FIG. 2, it is preferred that the average power density of laser beam 4 is from 5 to 50,000,000 W/cm$^2$ provided that the average power density is defined as an average power of laser beam irradiation portion on the floating bubble 3 on a surface of molten glass 2 divided by an irradiation area, and that the irradiation area is defined as an area of a portion encompassed by a curve on which the energy density distribution becomes $1/e^2$ (e is the base of natural logarithm) of the maximum power density in the laser beam irradiation portion. When the average power density is less than 5 W/cm$^2$, it is not possible to apply sufficient wobble 10 to the floating bubble 3, and it may not possible to break the bubble, and thus, such a power density is not preferred. When the average power density exceeds 50,000,000 W/cm$^2$, the laser beam 4 is excessively absorbed in the molten glass 2, evaporation of the molten glass 2 is promoted to cause e.g. unevenness of glass composition, such being not preferred. The average power density is more preferably from 10 to 20,000 W/cm$^2$.

It is preferred to irradiate the laser beam 4 so that the irradiation area S4 of the laser beam 4 on the floating bubble 3 becomes smaller than the projection cross sectional area S3 that is the projection area of the floating bubble 3. If the irradiation area S4 of the laser beam 4 is larger than the projection cross sectional area S3 of the floating bubble 3, it is difficult to produce local wobble on a bubble wall, and it may be difficult to break the bubble, such being not preferred.

The diameter D3 of the floating bubble 3 is preferably at most 50 mm. A floating bubble 3 having a diameter D3 exceeding 50 mm is naturally broken by itself even without using the method for removing bubbles of the present invention, and accordingly, it is efficient to use the method for floating bubbles 3 having a diameter D3 of at most 50 mm.

Oscillation type of the laser beam 4 is also not particularly limited. It may be a continuous oscillation beam (CW beam), a pulsed oscillation beam or a modulated beam of continuous oscillation beam (continuous oscillation beam is ON/OFF modulated to periodically change the intensity), and it is preferred to irradiate laser beam of at least 0.1 Hz for at least 0.05 sec. More preferably, such a laser beam is irradiated for at least 0.2 sec. A $CO_2$ laser whose oscillation wavelength is most commonly 10.6 μm, is preferred, and when a laser beam 4 of this wavelength region is irradiated, the laser beam 4 is nearly completely absorbed into a floating bubble 3, and the temperature of a portion of the floating bubble 3 irradiated with the laser beam 4 can be locally raised. Further, by irradiating a laser beam of continuous wave of at least 0.1 Hz for at least 0.05 sec, it is possible to break the floating bubble 3 even if the irradiation area S4 of the laser beam 4 is larger than the projection cross sectional area S3 of the floating bubble 3.

When the laser beam 4 is a pulsed oscillation beam, the pulse width is preferably at most 600 msec. When the pulse width is small, it is possible to apply local strong wobble to the floating bubble 3, and accordingly, the pulse width is more preferably at most 200 msec.

In the method of the present invention, by scanning a laser beam 4 at a speed of at most 200 mm/sec relatively to a floating bubble 3 on a surface of molten glass 2, it is possible to break the bubble 3 well. Since the bubble 3 is broken by a laser beam 4 of at least 0.1 Hz for at least 0.05 sec, when the laser beam 4 is a pulsed oscillation beam, it is preferred to use a pulse frequency and scanning speed which achieve irradiation of the laser beam 4 of at least 0.1 Hz on the bubble 3 for at least 0.05 sec. Further, by using such a pulse frequency and scanning speed achieving irradiation of the laser beam 4 of at least 0.1 Hz on the bubble 3 for at least 0.05 sec, it is possible to break the bubble 3 even if the irradiation area S4 of the laser beam 4 is larger than the projection cross sectional area S3 of the floating bubble 3.

Further, according to the method for removing bubbles of the present invention, it is possible to continuously remove bubbles 3 on a surface of a molten glass 2 that is continuously supplied in a glass production line. In this step, the effect of this method can be increased by combining the method with another bubble-removal means such as adding a refining agent, spreading an antifoaming agent on a bubble layer, use of a bubbler in a melting bath 1, pressure reduction of refiner, or use of stirrer at an outlet from the refiner. The method for removing bubbles of the present invention is preferably used in a melting bath 1 under a reduced pressure condition.

FIG. 4 is a schematic explanation view of an apparatus for removing bubbles according to the present invention. As shown in FIG. 4, the apparatus for removing bubbles of the present invention comprises a mechanism 13 for irradiating at least one laser beam 4 on a floating bubble 3 on a surface of molten glass 2, and a mechanism 12 for scanning the laser beam 4 relatively to is the floating bubble 3 on the molten glass 2. The apparatus for removing bubbles of the present invention is preferably employed at a place such as an outlet of a refiner or an inlet of a bath for forming a glass plate in a forming step such as a float method, where bubbles in a molten glass 2 moves up and gather on a surface. The apparatus is particularly preferably employed at a place such as an upper end portion of a downfalling pipe of vacuum degassing, where the molten glass 2 flows towards downstream side with a narrow width. Here, in a place where the width of stream of the molten glass 2 towards downstream side is wide, it is preferred to provide a guide on a surface portion of the molten glass 2 to gather floating bubbles 3, and it is preferred to provide a plurality of laser beams 4.

Further, when this apparatus for removing bubbles is used in a production line where a molten glass 2 is continuously supplied to produce a glass, the apparatus preferably has the following constructions, which are a construction that the apparatus has a sensor capable of automatically detecting a bubble 3 of a molten glass 2 so that a laser beam 4 is irradiated according to information of the sensor 14, a construction that a plurality of laser beams 4 are arranged along a width direction of the downstream flow of the molten glass 2 so as to form a curtain shape for irradiation, or a construction that a laser beam 4 is scanned in a width direction of the downstream flow of the molten glass 2 for irradiation.

EXAMPLES

From now, the present invention is described in more detail with reference to Examples.

In a process of melting a glass raw material, supplying obtained molten glass to a melting bath in a reduced pressure (210 mmHg (128 kPa)), and subsequently supplying the molten glass to a glass plate forming step to produce a glass substrate (product name AN100, manufactured by Asahi Glass Company, Limited), an apparatus for removing bubbles shown in FIG. 4 was employed to irradiate a laser beam of a carbon dioxide gas ($CO_2$) laser (wavelength is 10.6 μm) to a floating bubble on a surface of molten glass in the melting bath. Here, in this Example, detection of bubbles is carried out through a window (not shown) for observing inside provided on the melting bath, by using a camera attached outside the window for observing inside. With respect to irradiation, the laser beam was irradiated on a floating bubble on the surface of molten glass so that the irradiation portion has a circular cross section. Table 1 shows irradiation conditions. Here, the irradiation angle A of the laser beam to the surface of molten glass was set to be 70°.

Diameter of floating bubble (diameter in its projection cross section): B (mm)

Diameter of irradiation portion on floating bubble: C (mm)

Projection cross sectional area of floating bubble: S3 ($mm^2$)

Irradiation area on floating bubble: S4 ($mm^2$)

Laser beam oscillation type (hereinafter it may be referred to as oscillation type)

type 1 pulsed oscillation beam (repetitive frequency 1 Hz, pulse width 200 msec)

type 2 pseudo-continuous oscillation beam (CW beam)

Average power of laser beam: P (W)

Average power density of laser beam: Q ($W/cm^2$)

Relative scanning speed of laser beam: U (mm/sec)

TABLE 1

|  | Ex. 1 | Ex. 2 | Ex. 3 | Ex. 4 | Ex. 5 | Ex. 6 | Ex. 7 | Comp. Ex. 1 |
|---|---|---|---|---|---|---|---|---|
| B (mm) | 0.5 | 14 | 14 | 30 | 0.5 | 10 | 10 | 4 |
| C (mm) | 1 | 1 | 1 | 14 | 1 | 1 | 10 | — |
| S3 ($mm^2$) | 0.2 | 154 | 154 | 707 | 0.2 | 79 | 79 | 13 |
| S4 ($mm^2$) | 0.8 | 0.8 | 0.8 | 154 | 0.8 | 0.8 | 79 | — |
| Oscillation type | Type 1 | Type 1 | Type 1 | Type 2 | Type 2 | Type 2 | Type 2 | No irradiation |
| P (W) | 9 | 9 | 3 | 20 | 50 | 50 | 30 | — |
| Q ($W/cm^2$) | 1,125 | 1,125 | 375 | 13 | 6,250 | 6,250 | 38 | — |
| U (mm/sec) | 0 | 0 | 10 | 10 | 10 | 10 | 0 | — |

As a result of the test, a bubble could be removed in 0.16 sec of laser beam irradiation in each of Examples 1 and 2, 0.1 sec in Example 3, 0.13 sec in Example 4, and 0.12 sec in each of Examples 5 and 6. In Example 7, there were floating bubbles broken by 12 sec of laser beam irradiation and bubbles whose size was reduced to 0.4 mm but remained unbroken. On the other hand, in Comparative Example 1 being a conventional melting step, floating bubbles remained unbroken. Here, these Examples were tested in a melting bath under a reduced pressure condition (210 mmHg), but the same effect can be obtained when a laser beam is irradiated to bubbles on a molten glass surface in a melting bath of normal pressure.

INDUSTRIAL APPLICABILITY

The method of the present invention can be widely applied to glass plates for which presence of defects in the glass is a problem. Particularly, the present invention is suitable for glass substrates for flat panel displays such as liquid crystal displays, plasma displays, organic EL displays or field emission displays.

Further, the method of the present invention may be used in a glass production step such as that of a float method, a fusion method or a downdraw method.

The entire disclosure of Japanese Patent Application No. 2006-132406 filed on May 11, 2006 including specification, claims, drawings and summary is incorporated herein by reference in its entirety.

What is claimed is:

1. A method for removing bubbles from molten glass on a surface of molten glass, the method comprising:
    irradiating a floating bubble on the surface of molten glass with at least one laser beam, wherein a bubble size is from 0.5 to 50 mm,
    wherein the laser beam has a wavelength of from 3 to 11 µm, and the repetitive frequency of the laser beam is at least 0.1 Hz, and the laser beam is irradiated for at least 0.05 sec, and
    wherein the laser beam is scanned relatively to the floating bubble on the molten glass surface at a speed of at most 200 mm/sec.

2. The process for removing bubbles from molten glass according to claim 1, wherein the at least one laser beam is incident on the surface of molten glass at an angle of at least 45°.

3. The method for removing bubbles from molten glass according to claim 1, wherein an average power density of the at least one laser beam is from 5 to 50,000,000 W/cm$^2$, provided that the average power density is an average power of a laser beam irradiation portion on the floating bubble on the surface of molten glass divided by an irradiation area, and the irradiation area is an area of a portion encompassed by a curve on which the energy density distribution becomes $1/e^2$ of the maximum power density in the laser beam irradiation portion, wherein e is the base of natural logarithm.

4. The method for removing bubbles from molten glass according to claim 1, wherein an irradiation area of the at least one laser beam on the floating bubble is at most a projected cross sectional area of the floating bubble.

5. A process for producing glass, the process comprising:
    melting a glass raw material,
    removing floating bubbles remaining on a surface of molten glass by the method for removing bubbles from molten glass according to claim 1, and
    forming and solidifying the molten glass.

6. The process for producing glass according to claim 5, wherein the removing of floating bubbles on the surface of molten glass is carried out in producing glass plates from continuously supplied molten glass.

* * * * *